Oct. 19, 1971     H. C. FEDER     3,613,262
COINCIDENT DISPLAY ARRANGEMENT AND PRESENTATION OF
DIFFICULTY DIFFERENTIATED PROGRAMMED INSTRUCTION
Filed June 30, 1969
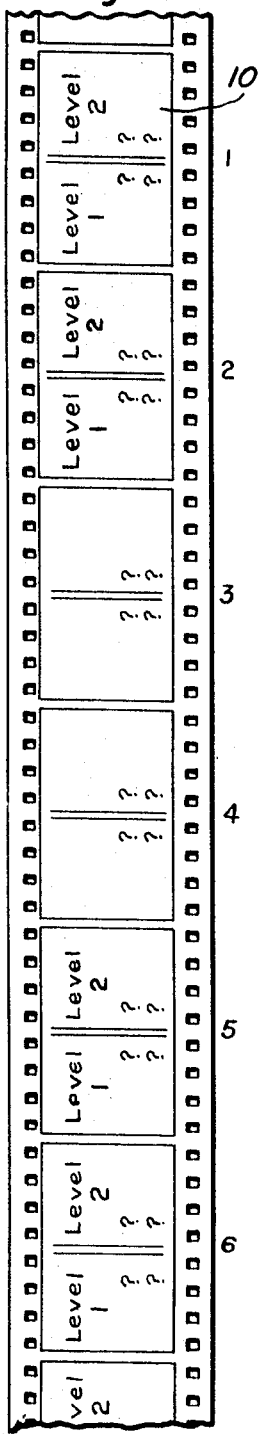
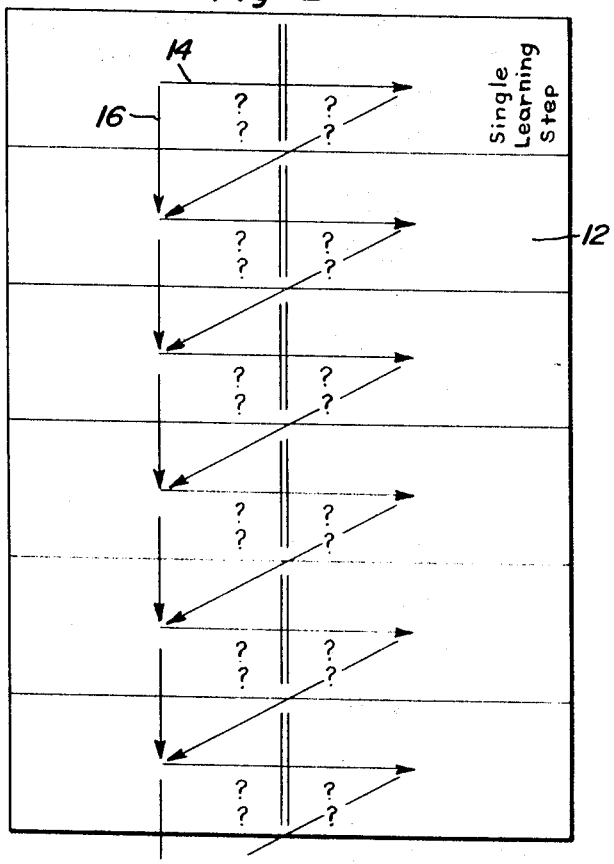
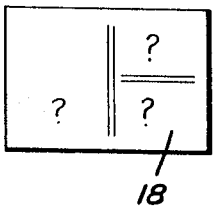
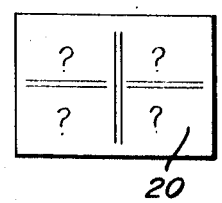
Hubert C. Feder
INVENTOR.
BY *Clarence A. O'Brien*
and *Harvey B. Jacobson*
Attorneys United States Patent Office 3,613,262
Patented Oct. 19, 1971

3,613,262
COINCIDENT DISPLAY ARRANGEMENT AND PRESENTATION OF DIFFICULTY DIFFERENTIATED PROGRAMMED INSTRUCTION
Hubert C. Feder, 1517 Roosevelt Ave., Alamogordo, N. Mex. 88310
Filed June 30, 1969, Ser. No. 837,773
Int. Cl. G09b 1/16
U.S. Cl. 35—8 R                                 1 Claim

ABSTRACT OF THE DISCLOSURE

The arrangement of instructional material in educational texts, films, filmstrips or other similar means of communication for teaching groups of learners in which individual learners are distinguished by different learning ability with the communication means being divided into composite learning frames having a plurality of sectors, each sector containing subject matter material presented on different levels of difficulty of the learning goal and each level of difficulty offering multiple questions to support simultaneously learning toward different learning goals in the same time period by learners of different ability levels.

BACKGROUND OF THE INVENTION

The present invention pertains to the coincident display arrangement and presentation of level of difficulty differentiated programmed instruction to facilitate individualized learning in a group teaching situation in which all learners are subjected to the same learing step containing learning material offered on different levels of difficulty with each individual learner permitted to learn on that level of difficulty that best suits his individual ability.

Generally, specific arrangement of subject matter material is known by the name of programmed instruction. However, the principles used with the arrangement of programmed instruction necessarily differ decisively with the philosophy of the instructional approach. To make evidence the novelty of the present invention, it is desirable to discuss the philosophy, goal and methods of presently known and applied texts, films, film-strips or other means of communication. It has long been recognized that organized (programmed instruction) and mechanized learning must consider the individual difference in ability and pacing. For that reason, Skinner breaks down the learning process into single learning units, steps or frames so small that learning must occur disregarding the ability and pacing differences found among individual learners. The Skinner method, known as linear programming, is considered effective only if each preceding step or frame is well understood before the next step or frame is presented. Consequently, the display of single frames must occur subsequently. Skipping of frames is permitted in this method in support of more advanced students able to take larger steps.

In contrast, Crowder uses longer steps or frames presented in a fashion known as branching or "intrinsic" learning. The individual learners in accordance with their needs are guided through different frames, sequences or tracks in pursuit of the same learning goal whereby each step or frame is designated to one particular level of difficulty presented on a particular track or book page. Of course, individual learners, distinguished by learning ability and pacing, require individual display means in learning toward the same goal.

(See Skinner, Pat. No. 3,056,215 and Crowder Pat. No. 3,123,920.)

The methods of Skinner and Crowder are dominantly used in programmed instruction by texts or machines, however, with various modifications. Leslie (Pat. No. 3,284,923) supports individualized learning by the parallel arrangement of different learning tracks with emphasis on two components of the multiple-channel strip for displaying a plurality of image areas and a channel switching device. Only the multiple-channel filmstrip is of interest here. The filmstrip used by Leslie is defined as a multiple-channel projection film consisting of frames or image areas. It is evident, and particularly illustrated by the mechanical switching device that the filmstrip used by Leslie distinguishes different frames or image areas which, as units of different level of difficulty channels, like in linear and branched instruction, are presented subsequently. It is explicitly stated that a learner advances from frame (image) to frame within a channel until the end frame of the same channel is reached and that the learner's answer to the last frame of the first channel decides which channel will be subsequently presented to the learner. Obviously, the filmstrip must be rewound or reversed to present effective learning steps on different channels arranged in parallel fashion yet without crosswise interrelation between frames of different channels. It is further stated that a single frame mask is used to formed one image only out of a parallel row of images of different channels and it is specifically stated that one frame (image) only is viewable at any time and all other information is obscured from the learner. Further, it is specified that a single frame mask corresponds to the size of individual single-channel image areas. Moreover, it follows that the chosen multiple-channel arrangement as discussed is designed only in support of learners working on an individual basis and that different learners according to their differences in ability and pacing are in need of separate individual display means.

The Feder patent (3,300,877) discloses a system generally of the same group as the systems discussed above insofar as the mentioned teaching device refers also to linear and branched methods of instructional programs mechanically controlled by skipping of level differentiated frames in response to the request of a certain percentage of learners guided through different routines and subroutines toward the same learning goal.

Any one of the discussed methods encompasses a variety of difficulties and shortcomings which have prevented programmed instruction from achieving the educational improvement hoped for due to the fact that the design of effective programmed instruction has been jeopardized by the lack of knowledge how learning really functions. The disproportion between cost and educational gain requires considering simplification by reviewing the underlying principles of learning. The generally accepted thesis of individual learning with all learners permitted to advance toward a common goal yet in different time as governed by their individual ability to learn represents the main complication of existing ways and means. Additionally, theory held that program autonomy is to be preserved without outside interference if programmed learning is to be effective. Thus, a teacher or instructor is prevented from giving immediate correction of individual shortcomings. Finally, a complete full year curriculum program designed on commonly applied learning theories requires so many frames which need by far more time than normally available in educational courses. For these reasons, a new approach to programmed instruction has been taken and has been successfully tested.

SUMMARY OF THE INVENTION

It is a general objective of the disclosed invention to facilitate individualized learning in a group teaching situation, in which all learners are subjected to the same learning steps, one at a time, by visual communication such as texts, films or filmstrips. Each of the learning steps contains a plurality of sectors each having learning material offered on different levels of difficulty. This permits each individual to learn on that level of difficulty that best suits his individual ability to assimilate the presented material on the selected level in approximately the same time other learners are able to assimilate different levels of material within the same step.

It is a particular object that the arrangement of level of difficulty differentiated learning steps is suitably for use with display means of conventional make, size and format by which means the subject disclosed represents a considerable simplification of programmed instruction application and a drastic reduction of the cost of educational procedures.

Another object of the disclosed subject matter arrangement is to facilitate a learning situation in which the instructor is continuously, and at anytime aware of the individual learner's ability level and needs, and in which all learners are continuously challenged by answer scores to advance to the next higher level of difficulty within a learning step.

A still further object of the invention is to insure that each individual learner gains mastery of all subject matter details specified by a curriculum on a level that corresponds to his individual ability level.

Still another important object of the present invention is the application of level of difficulty differentiated frames to assess with each single frame by live teacher or by automatic devices, the learning progress for the purpose of grading individual learners or recognizing the need for individual guidance.

DESCRIPTION OF THE DRAWINGS

FIG. 1 is a schematic view of a filmstrip illustrating the present invention.

FIG. 2 is a plan view of a textbook arrangement.

FIGS. 3 and 4 each illustrate a single composite frame of conventional size and format subdivided to simultaneously present multiple level of difficulty learning steps.

DESCRIPTION OF THE PREFERRED EMBODIMENTS

The underlying principles of the new approach to programmed instruction in this invention are discussed as follows:

(1) Learning goal: The time available in educational courses constitutes a constraint. The effect being that individual learners working with different sequences of learning steps or farmes toward a goal common to all learners are untable to complete the subject matter specified by the curriculum.

In contrast, the disclosed "Coincident Display" arrangement and presentation of level of difficulty differentiated programmed instruction offers level of difficulty differentiated, different learning goals on each multi-sectored learning step or frame thus offering all learners a chance to follow throughout the curriculum though at different levels of difficulty, however, under the continuous challenge to proceed from the less difficult to the more advanced level of learning.

(2) Level of difficulty: Since unique and generally accepted definitions of difficulty differences are not available, it is permissible and necessary to formulate a definition as a base in discussing level of difficulty differentiated programmed instruction. Several learning principles can be applied with the disclosed "Coincident Display" of programmed instruction toward more or less difficult learning goals. As a preferred version, reference is made to the learning principle known as "Gestalt Theory." For example, one learning goal in algebra may be the solution of the equation $$\frac{a(b-c)}{4} = \frac{A}{4} = 1 \Big| \Big| \frac{x^3 y (4-y^{-1})}{4x^2} = \frac{A}{4} = 1$$

The learner finds himself in the same position as a monkey in a cage containing a banana on a string out of her reach, a rock and a stick. The monkey has to "know" that the rock and the stick can be used as tools, has to "learn" which tool is best in getting the banana. Likewise, the student confronted with the complex "Gestalt" (form) of the given equation has to discriminate and to apply the Gestalt components such as inverse operation, distributive property, reciprocals and multiplication of exponential terms. The "Gestalt" components of the given example consisting of four different operations $A = ?$; $a(b-c) = ?$; and at a stilll more advanced level of difficulty $y^{-1} = ?$; $x^3/x^2 = ?$. These components are usually understood by all learners if presented separately. However most learners have difficulties if same operations are combined in one complex "Gestalt." It is implied that the number of mental operations needed determine the difficulty level of any given problem. Accordingly, the same learning goal is approached by all of the learners by simultaneously presenting several problems distinguished by the number of operations required to suit the ability differences found among different learners. Similar examples can be construed for any other subject matter to illustrate that the number of required steps can be starkly reduced and simplified if the program based on level of difficulty differentiated learning goals permits individual students to learn toward the goal that is in their reach. That is, it is considered satisfactory if most students are able to understand the simple "Gestalt" of the left side of the composite frame while some students are able to solve both sides of the frame in the same period of time.

(3) Time constraint: On this basis of learning toward simultaneously presented different goals in terms of the degree of difficulty, pacing differences among individual learners become irrelevant. The multi-sectored frames can be composed in such a way that each learner proceeds on the level of his ability to complete as many sectors as possible within the allowed amount of time. It is for that reason that the disclosed subject permits individual learning in a conventional classroom or group learning situation heretofore never accomplished by any other method of programmed instruction. The learning effect of the multiple learning goal frame is secured if short sequences of 6–10 multiple learning goal single frames are presented in accordance with learning principles known as "Learning Set Formation."

(4) Criteria of disclosure: The preceding background analysis was made to establish that the disclosed "Coincident Display Arrangement" of multiple goal, composite learning steps or frames has been conceived to make possible the application of a new learning approach. None of the existing means, devices or procedures satisfies the requirements and objectives of the disclosed subject. The known group teaching texts, frame or devices use one level learning steps or frames only and the known level of difficulty differentiated learning procedures require individual learning tracks or channels to support individual differences in learning ability and pacing. Even in disregard of the learning principles and from a purely physical viewpoint it is impossible to use any form of existing program arrangement without considerable complication and inflation of the procedure and expenditures in support of the disclosed subject matter arrangement which is best satisfied by applying the multiple level of difficulty material on multi-sectored frames of conventional size and format. Applying unconventional sizes or format would require a special design of the photographic facilities and optical display means and devices and, therefore, is prohibitive. In other words, the disclosed arrangement of level of difficulty differentiated learning sectors simultaneously presented by multi-sectored frames of conventional size and format presents a different and advanced way of programmed instruction of considerable savings in the area of program composition and display means. Preferably, six multiple level of difficulty—composite frames of conventional size and format form a learning sequence based on the theory of Learning Set Formation as used with filmstrips as illustrated in FIG. 1 and with books as illustrated in FIG. 2. Each composite frame of conventional size and format is subdivided in support of simultaneously presented multiple level of difficulty learning sectors, see FIGS. 3 and 4. These figures illustrate the arrangement of a three or four level of difficulty differentiated learning material respectively, in a fashion that pursues the use of display means of conventional size and format. With each level of the multiple sectored frames, multiple questions are presented to the learner who may select the level he can assimilate best. It has been found that generally the learner, motivated by grades, is continuously challenged to proceed to the next higher level of difficulty on the same frame. The continuity of the learning progress of different learners working simultaneously on the same composite frame is secured by application of the "Gestalt" theory which facilitates the "coincident" presentation of difficulty differentiated learning goals pertaining to the same subject matter topic.

FIG. 1 illustrates a filmstrip 10 with six composite frames with two levels of difficulty thereon. Each composite frame, 1–6, is offered to all learners with each composite frame having two levels of difficulty differentiated materials thereon. Only a single composite frame is shown at one time, and all learners within the group are exposed to the frame for the same period of time.

FIG. 2 illustrates a learning set formation sequence of fixed single composite frames with each frame containing two levels of difficulty as used with a textbook page 12. It is illustrated schematically that individual learners always have the chance to advance to the next higher level in the same composite frame. That is, the learner may advance from the first level to the second level in the same composite frame along lines 14. If he is unable to advance to the second level, he merely advances to the second composite frame at the first level along line 16, when the second composite frame is displayed to him.

FIGS. 3 and 4 illustrate composite frames 18 and 20 which have three and four levels of learning thereon with the number of levels being varied depending upon the individual requirements of a particular subject matter.

By using the "Coincident Display" arrangement and presentation of level of difficulty differentiated programmed instruction simplifies and hence economizes the application of programmed instruction by facilitating individualized learning with only one group presentation or display means shared by all individual members of a learning group and increases learning efficiency by continuously offering the individual learner with each single learning unit, step or frame, a challenge to proceed from a simple elementary level of learning to a more advanced level.

By using the disclosed system of learning, all learners learn the same number of topics though at different levels of difficulty. Furthermore, this system provides each learner with a permanent challenge to proceed from the lesser levels toward the higher levels of difficulty. Research with this system has confirmed that the application of adequately structured composite frames has significantly improved the number of topics learned within a period of time as well as the level of understanding of the learned topics. It is also evident that the learners are indeed following the challenge offered to proceed to the higher levels of difficulty.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The method of teaching groups of learners comprised of individual learners distinguished by different learning ability and pacing working with film projection means of communication, said method consisting of the steps of sub-dividing and arranging the film projection communication means into a series of multi-sectored composite learning frames and sequentially displaying in order as they have been arranged each composite learning frame one at a time to the group of learners, each composite learning frame presenting subject matter material on different levels of difficulty of the learning goal with each level of difficulty being displayed on a separate sector and offering learning material and at least one corresponding question related thereto to support simultaneous learning by the group toward the learning goal, each of the individual learners within a group being simultaneously exposed to the same composite learning frames for the same time period and being able to choose any one of the degrees of difficulty, learning material and questions related thereto within the composite learning frame being displayed to the group, the step of sequentially displaying each leaning frame being indepndent of the learners' responses to questions contained in the previous learning frame, the relative position and display of each of the series of learning frames being predetermined in the step of sub-dividing and arranging the communication means.

References Cited

UNITED STATES PATENTS

| | | | |
|---|---|---|---|
| 1,292,153 | 1/1919 | Thompson | 352—40 |
| 2,939,224 | 6/1960 | Rose et al. | 352—39 X |
| 3,242,596 | 3/1966 | Smith | 35—9 X |
| 3,273,260 | 9/1966 | Walker | 35—9 |

WILLIAM GRIEB, Primary Examiner

U.S. CL. X.R.

353—121